United States Patent [19]

Scheel et al.

[11] 4,039,616

[45] Aug. 2, 1977

[54] PROCESS FOR THE MANUFACTURE OF STABILIZED, HARDENABLE CALCIUM SULPHATE BY REACTING CRUDE PHOSPHATE WITH SULPHURIC ACID

[75] Inventors: Kurt Scheel, Hamburg; Franz Wirsching, Iphofen, both of Germany

[73] Assignee: Gebr. Knauf Westdeutsche Gipswerke, Germany

[21] Appl. No.: 582,775

[22] Filed: June 2, 1975

[30] Foreign Application Priority Data

June 5, 1974 Germany .............................. 2427122

[51] Int. Cl.$^2$ .............................................. C01B 25/16
[52] U.S. Cl. .................................. 423/166; 423/167; 423/320; 423/555
[58] Field of Search ................ 423/555, 266, 320, 167, 166; 106/109, 110, 315

[56] References Cited

U.S. PATENT DOCUMENTS

| | | | |
|---|---|---|---|
| 3,512,927 | 5/1970 | Betts | 423/320 |
| 3,552,918 | 11/1966 | Fitch et al. | 423/167 |
| 3,671,189 | 6/1972 | Betts | 423/320 |
| 3,795,728 | 3/1974 | Scheel | 423/320 |
| 3,972,981 | 8/1976 | Harper et al. | 423/555 |

*Primary Examiner*—Earl C. Thomas
*Assistant Examiner*—Wayne A. Langel
*Attorney, Agent, or Firm*—Anthony J. DeLaurentis

[57] ABSTRACT

Calcium sulphate produced by reacting crude phosphate with sulphuric acid is washed with aqueous solutions of condensed and complex aluminium fluorides of the general formulae MeAlF$_4$, Me$_2$AlF$_5$ and Me$_5$Al$_3$F$_{14}$ as well as AlF$_3$.nH$_2$O, in which Me represents an alkali metal, ammonium or thallium-I ion and $n$ is a number between 1 and 9.

10 Claims, No Drawings

PROCESS FOR THE MANUFACTURE OF STABILIZED, HARDENABLE CALCIUM SULPHATE BY REACTING CRUDE PHOSPHATE WITH SULPHURIC ACID

As is known, the reaction of crude phosphate and sulphuric acid is employed on an industrial scale for manufacturing phosphoric acid. In this connection the so-called "dihydrate process" is preferably used, in which a phosphoric acid containing 30 to 32% by weight of $P_2O_5$ is obtained. This process is carried out under conditions in which the calcium sulphate formed in the decomposition of the crude phosphate with sulphuric acid occurs as calcium sulphate dihydrate. After it has been separated from the phosphoric acid, this calcium sulphate dihydrate is so stable that it can be washed with water without any undesirable consequences, and the phosphoric acid adhering externally to it can be removed without causing any blocking or the filter. However, it is known that this calcium sulphate dihydrate still contains small amounts of phosphates which are trapped within the crystal structure of the calcium sulphate dihydrate and accordingly cannot be removed therefrom by simply washing with water. If a low water content and hardenable calcium sulphate is to be manufactured from this calcium sulphate dihydrate, these phosphates may hinder the setting process to some extent with the result that the products produced by this method cannot be used for all industrial applications in which a hardenable calcium sulphate prepared from crude gypsum/is directly used. For these reasons numerous processes have been developed which are primarily aimed at reducing or completely removing the content of phosphates which cannot be washed out with water, from the calcium sulphate dihydrate formed in the manufacture of phosphoric acid from crude phosphate and sulphuric acid. Thus, according to a known process such as for example described in German Patent Specification 1,567,821, a hardenable hemi-hydrate can be obtained in a high yield from such a calcium sulphate dihydrate by, for example, dehydrating the calcium sulphate dihydrate in a mixture of concentrated sulphuric acid and phosphoric acid. However, since it is also necessary in this case to separate the calcium sulphate hemi-hydrate from the acid mixture and wash it with water, there is the danger of a premature and undesirable hydration of the product and the resultant considerable operational and processing difficulties. The reaction between the crude phosphate and sulphuric acid can, as is known, also be carried out under conditions in which the calcium sulphate formed is obtained directly as calcium sulphate hemi-hydrate. Such a process is for example described in British Patent Specification No. 1,135,951. The basic advantage of this process is the high concentration of phosphoric acid, which is obtained with a content of 45 to 50% by weight of $P_2O_5$. This process differs advantageously from the previously mentioned dihydrate process or the known dihydrate/hemihydrate process in that in the hemi-hydrate process a phosphoric acid is formed in a concentration, without the need for evaporation, to which the phosphoric acid obtained by the dihydrate process can be converted only by additional evaporation. A basic disadvantage of the hemi-hydrate process is however the fact that from the time when the calcium sulphate hemi-hydrate is separated from the hot phosphoric acid and washed with water, it is no longer in thermodynamic equilibrium and may consequently "set" on the absorption of water. This hardening may lead to incrustations and obstructions of essential parts, particularly pipes and filter materials. For these reasons processes have been developed and have become known, according to which it is possible to separate the calcium sulphate hemi-hydrate from the reaction mixture as fairly coarse crystals or crystal aggregates, using recent crystallisation techniques. The disadvantage of this for the further processing of such products is the more or less large $P_2O_5$ content. A limited stability of the calcium sulphate hemi-hydrate is mainly achieved in accordance with this process by not completely reacting the crude phosphate with the sulphuric acid, and by the intentional incorporation of phosphate ions in the crystal lattice of the calcium sulphate hemi-hydrate formed. The stability of this calcium sulphate hemi-hydrate is moreover always limited to such an extent that after separation from the reaction mixture, it can be washed only incompletely, to avoid hydration. The product obtained by this method is unsuitable for direct further processing on account of its high $P_2O_5$ content. However, in order to be able to utilise industrially the advantage of the high phosphoric acid concentration occurring in this process, the calcium sulphate hemi-hydrate formed by this process is converted into the dihydrate by another known procedure, and is only then washed so as to be finally converted, with the expenditure of energy, into a hardenable modification of calcium sulphate, as for example described in U.S. Pat. Spec. No. 3,653,826.

Since the calcium sulphate formed according to this process can be converted into an industrially usable product only by employing extremely troublesome and time-consuming measures, an attempt was made to find simpler possible methods of stabilising the calcium sulphate formed.

A process has been discovered for manufacturing stabilised hardenable calcium sulphate, particularly calcium sulphate hemi-hydrate, by reacting crude phosphate with sulphuric acid and washing the calcium sulphate with an aqueous medium. The calcium sulphate in the form of the hemi-hydrate is washed with aqueous solutions of condensed and complex aluminum fluorides of the general formulae $MeAlF_4$, $Me_2AlF_5$ and $Me_5Al_3F_{14}$, and also $AlF_3.nH_2O$, in which Me represents an alkali metal, ammonium or thallium $-I$ ion and $n$ is a number between 1 and 9.

To carry out the process of the invention, crude phosphate is reacted in a manner known per se with sulphuric acid to form calcium sulphate and phosphoric acid. This reaction may advantageously be carried out by maintaining conditions, such as for example concentrations and temperatures, under which the calcium sulphate is formed directly as the hemi-hydrate and can be separated from the phosphoric acid. These processes are for example described in detail in "Chemical Process Review No. 9" (Noyes Development Corp. Publishing Co., London W1) under the title "Phosphoric acid by the wet process 1967", page 118 ff., together with source references.

The separated calcium sulphate hemi-hydrate, which is still filter moist, still contains considerable amounts of adhering phosphoric acid which must be removed as much as possible by subsequent washing.

A calcium sulphate hemi-hydrate which has been separated from the reaction products formed from crude phosphate and sulphuric acid as the dihydrate, first of all, and which has then for example been dehydrated in a mixture of concentrated sulphuric and phosphoric acids to form the hemi-hydrate, may also be used as starting material. This product too contains so many impurities that it has to be subsequently washed. Descriptions of these known processes may be found, together with further literature references, on page 1 ff. of the afore-mentioned publication.

In accordance with the invention, an aqueous solution of condensed and complex aluminium fluorides which corresponds to the afore-mentioned general formulae is used as wash liquid for the hardenable calcium sulphate, and the said fluorides stabilise the hardenable calcium sulphate, particularly the calcium sulphate hemi-hydrate, to such an extent that hydration is almost completely prevented, at least for the duration of the wash process and the optionally associated drying process, and preferably throughout this whole period of time. The stabilising action of the condensed and complex aluminium fluorides used in accordance with the invention is so great, particularly in acid media, that even small amounts of these aluminum fluorides are sufficient to delay greatly the hydration of the hardenable calcium sulphate, particularly the calcium sulphate hemi-hydrate, and thereby stabilise the hardenable calcium sulphate as such. The amounts of condensed and complex aluminum fluorides used for these purposes may however vary within wide limits. In practice it has been found suitable to use the condensed and complex aluminum fluorides in accordance with the invention in amounts of $>0$ to 1.0% by weight referred to the amount of calcium sulphate to be washed. Since coarse grain hardenable calcium sulphates, particularly calcium sulphate hemi-hydrate, are not as easily hydrated, for example in contrast to the fine grain crystalline product, even small amounts of the condensed and complex aluminum fluorides used in accordance with the invention are sufficient to effect stabilisation, whereas comparatively large amounts of aluminum fluorides have to be added to the fine grain crystalline product in order to produce the same effect. In addition, the amount of aluminum fluorides in accordance with the invention is determined by the desired duration of stabilisation. The longer the duration of stabilisation, the greater must be the amounts of aluminum fluorides added. The stabilising effect of the aluminum fluorides used in accordance with the invention can be extended to hours and days by adding larger amounts. The amounts of aluminum fluorides to be used in any particular case can be determined by means of a simple preliminary test. The calcium sulphate, particularly calcium sulphate hemi-hydrate, obtainable in phosphoric acid manufacture can be stabilised in this way so that it can be transported over comparatively long distances or stored before it is processed further. Given these conditions, the subsequent further processing of the hardenable calcium sulphate obtained from the phosphoric acid manufacture can be operated more independently of the total process for obtaining calcium sulphate and phosphoric acid from crude phosphate and sulphuric acid. The stabilised, hardenable calcium sulphate, particularly calcium sulphate hemi-hydrate, in accordance with the invention can be dried in conventional driers, for example in a drying drum, without suffering any decrease in its setting properties.

The aluminium fluorides used in accordance with the invention are sparingly soluble compounds. Thus, the solubility of chiolith ($Na_5Al_3F_{14}$) in water at room temperature is only 0.04%, and that of aluminum fluoride trihydrate is 0.4%. It is generally sufficient to use the aluminum fluorides employed in accordance with the invention in the form of an approximately saturated aqueous solution. However, if a prolonged stabilisation of the hardenable calcium sulphate is to be achieved, the concentration of the aqueous solution can be increased by various measures.

Since the calcium sulphate produced in the phosphoric acid manufacture is normally washed with hot water in order to improve the washing effect, in many cases the desired greater amount of aluminium fluoride may be dissolved in hot water, the advantage being that the solubility of the aluminium fluorides increases as the temperature rises. A further increase in the concentration of aluminium fluorides can be achieved by acidifying the water used as solvent. In the phosphoric acid manufacture sulphuric acid and phosphoric acid are particularly appropriate for this purpose since both acids are components of the process. Consequently no undesirable effects can occur during the further use of the wash water in the course of the customary systematic counter-current washing of the calcium sulphate. In order not to counteract the purification effect of washing the calcium sulphate on the filter, low acid concentrations are sufficient to raise the the solubility of the aluminium fluorides in the wash waters by an adequate amount. In accordance with the invention, the said acids are therefore used only in concentrations of $>0.0$ to 1.0%, preferably 0.1 to 0.5%.

The enhancement of the effect of the stabilisers used in accordance with the invention brought about by employing them in an acid medium is particularly surprising since the hydration of of hardenable calcium sulphates, particularly calcium sulphate hemi-hydrate, is accelerated by mineral acids.

In many cases, for example when transporting the hardenable calcium sulphate, especially calcium sulphate hemi-hydrate, over fairly long stretches, it is desirable to extend the stabilisation to several days. In accordance with the invention, this prolonged stability can be achieved by adjusting the pH of the "mash" treated with acid, preferably phosphoric acid, aluminium fluoride solution, or the pH of the appropriately treated suspension of the hardenable calcium sulphate, to a value of 4 – 5.

This partial neutralisation can be effected with conventional alkalis, hydrated lime or sodium or potassium hydroxide being particularly suitable. If an accurate adjustment to a specific pH value is dispensed with, a small amount, for example 1 to 5% by weight, of calcium carbonate in the form of limestone powder can be mixed in instead of these alkalis.

A further particular advantage of the process according to the invention is the fact that in the case of necessity, for example in the further processing of the stabilised hardenable calcium sulphate, particularly the calcium sulphate hemi-hydrate, the effect of the stabiliser is further increased and accordingly the setting of the calcium sulphate can be accelerated as desired. Thus, for example, the hydrogen ion concentration of the mash or suspension of hardenable calcium sulphate in water can be shifted to the alkaline range by adding soluble compounds having an alkaline action. Any desired alkalis may be used for this purpose, although hydrated lime may particularly advantageously be used in this case also. However, if the hydrogen ion concentration of the mash or suspension should not be altered on account of technical reasons, the stabilising effect of the aluminium fluorides used in accordance with the invention may be raised by grinding the crystals of the hardenable calcium sulphate, particularly calcium sulphate hemi-hydrate, preferably using a wet grinding technique.

The process in accordance with the invention may also be advantageously used within the scope of the wet process for producing phosphoric acid from crude phosphate and sulphuric acid, in which the calcium sulphate, preferably the calcium sulphate hemi-hydrate separated from the reaction mixture is washed in a countercurrent wash with water or with so-called wash acid. In this connection, the wash water or the wash acid can be partially or completely recycled to the vessels in which the reaction of the crude phosphate with the sulphuric acid takes place. With such a type of countercurrent wash the aluminum fluorides employed in accordance with the invention need only be added to the system with the wash liquid, preferably water, added to the last stage of the countercurrent wash. Since with these countercurrent washes in most cases the wash liquids are lastly added to the reaction mixture in which the crude phosphate is reacted with sulphuric acid, the stabiliser used for this should be selected from the aluminium fluorides employed in accordance with invention, having regard to the composition and amount, in such a way that it can remain in the phosphoric acid produced without having any adverse effect on its further processing or use.

The process of the invention provides the technical advantage that the hardenable calcium sulphate isolated from the reaction of crude phosphate with the sulphuric acid is stabilised for at least the period of the washing or even beyond, and the stabilisation effect can be increased further at any time.

EXAMPLE 1 (INVENTION)

1 ton of Moroccan phosphate containing 33% by wt. $P_2O_5$ and 50.2% by wt. CaO is decomposed with 900 kg of sulphuric acid containing 93% by wt. $H_2SO_4$ at a temperature of 90° to 100° C in accordance with the process as described in U.S. Pat. No. 2,885,264. The calcium sulphate hemi-hydrate obtained after separating the production acid is washed in four wash stages in a countercurrent wash. 1 kg of chiolith per 1 m³ of wash water is previously dissolved in the wash water added hot to the last stage. By virtue of this procedure the calcium sulphate hemi-hydrate is stabilised in this crystal modification with the result that it can be washed in the countercurrent wash provided until its original $P_2O_5$ content of 1.5 to 2.0% by wt. has fallen to 0.5 to 0.6% by wt. and below. The calcium sulphate hemi-hydrate removed from the countercurrent wash can be dried and can then be stored for an unlimited time under the normal storage conditions for calcium sulphate hemi-hydrate, without any hydration of the calcium sulphate hemi-hydrate occurring after drying at a temperature of 45° C, its content of water of crystallisation is 6.0 to 6.4% by wt.

The following Table gives the hardening times of hemi-hydrate samples taken at different times from the experimental plant. They are measured at a water-gypsum ratio which is adjusted corresponding to the "interspersion" amount, and which lies between 0.45 and 0.50.

| Sample No. | Hardening times (mins) | | Interspersion amount (g) |
| --- | --- | --- | --- |
| | start | end | |
| I | 255 | >330 | 222 |
| II | 160 | 220 | 213 |
| III | 255 | >330 | 201 |
| IV | 150 | 175 | 208 |

EXAMPLE 2 (COMPARISON)

For the purpose of comparison, a further series of experiments was carried out under the same conditions as described in Example 1. In this case there was not addition of stabiliser to the last wash stage. The hardening times of the calcium sulphate hemi-hydrate thus produced are given in the following Table. The samples taken from the filter must be washed with methanol immediately after their removal to prevent hydration which would otherwise occur at once, and they may then be dried and prepared for the setting time measurement.

The following Table gives the hardening times of hemi-hydrate samples taken at various times from the experimental plant. They are measured at a water-gypsum ratio which is adjusted corresponding to the interspersion amount, and which lies between 0.45 and 0.50.

| Sample No. | Hardening times (mins) | | Interspersion amt. (g) |
| --- | --- | --- | --- |
| | start | end | |
| I | 22 | 75 | 198 |
| II | 23 | 80 | 204 |
| III | 15 | 33 | 211 |
| IV | 41 | 90 | 219 |

EXAMPLE 3 (INVENTION)

1 ton of Moroccan phosphate containing 33% by wt. $P_2O_5$ and 50.2% by wt. CaO is decomposed with a mixture of phosphoric acid and sulphuric acid at a temperature of 80° C in accordance with the process described in German Patent Specification No. 1,567,821, the $P_2O_5$ concentration in the decomposition mixture being 28% by wt. and the total $SO_3$ content being 2% by wt. When decomposition is complete a part of the liquid phase is withdrawn from the mixture obtained as production phosphoric acid. The remaining gypsum slurry is mixed at a temperature of 80° C with sulphuric acid (containing 96% by wt. $H_2SO_4$) in such an amount that the sulphuric acid concentration of the liquid phase is about 15% by wt. The calcium sulphate hemi-hydrate formed thereby is separated from the liquid part of the mixture, which is recycled to the crude phosphate decomposition mixture.

The separated calcium sulphate hemi-hydrate is washed in four wash stages in a countercurrent wash. 1 kg of chiolith per m³ is dissolved in the hot wash water added to the last stage. By virtue of this procedure the calcium sulphate hemi-hydrate is stabilised in this crystal modification, with the result that it can be washed until its $P_2O_5$ content has fallen to 0.1% by wt. and below, without being rehydrated. The calcium sulphate hemi-hydrate removed from the countercurrent wash can be dried and stored for unlimited time under the normal storage conditions without any noticeable rehydration occurring. The content of water of crystallisation of the calcium sulphate hemi-hydrate dried at a temperature of 45° C is 6.1% by wt.

We claim:

1. In a process for the manufacture of calcium sulphate hemi-hydrate, wherein crude phosphate is reacted with sulfuric acid to produce crude calcium sulphate hemi-hydrate, and wherein the crude calcium sulphate hemi-hydrate is washed with an aqueous medium to remove impurities therefrom, the improvement, which comprises:

washing the crude calcium sulphate hemi-hydrate with an aqueous solution of condensed and complex aluminum fluorides of the general formulae $MeAlF_4$, $Me_2AlF_5$, $Me_5Al_3F_{14}$ and $AlF_3 \cdot nH_2O$, in which Me represents an alkali metal, ammonium or thallium-I ion and $n$ is a number between 1 and 9.

2. Process according to claim 1, characterised in that condensed and complex aluminium fluorides are employed, which have been dissolved in dilute mineral acids.

3. Process according to claim 2, characterised in that condensed and complex aluminium fluorides are employed, which have been dissolved in dilute sulphuric acid or phosphoric acid, or mixtures thereof.

4. Process according to claim 3, characterised in that the concentration of the mineral acids is 0.01 – 1.0%.

5. Process according to claim 2, characterised in that the pH value of the aqueous suspension of hardenable calcium sulphate and condensed and complex aluminum fluorides is adjusted to 4 – 5.

6. Process according to claim 5, characterised in that the pH value of the suspension or mash of water and hardenable calcium sulphate is adjusted by the addition of alkaline-acting compounds of alkali and/or alkaline earth metals.

7. Process according to claim 1, characterised in that the condensed and complex aluminium fluorides are employed in amounts of >0–1.0% referred to the amount of hardenable calcium sulphate, and Me represents alkali metal or ammonium ion.

8. Process according to claim 1, characterised in that the pH value of the aqueous suspension of hardenable calcium sulphate, including condensed and complex aluminium fluorides, is adjusted to 7 and above by the addition of alkaline-acting compounds of alkali and alkaline earth metals.

9. Process according to claim 1, characterised in that the aqueous suspension of hardenable calcium sulphate and condensed and complex aluminium fluoride is ground.

10. Process according to claim 1, characterised in that the calcium sulphate is washed in a countercurrent wash and the condensed and complex aluminium fluorides are introduced into the system together with the wash liquid added in the last stage of the countercurrent wash.

* * * * *